UNITED STATES PATENT OFFICE.

EDWARD U. STEPHENS, OF BATTLE CREEK, MICHIGAN.

PROCESS FOR PREPARING LEGUMINOUS PRODUCTS FOR EDIBLE PURPOSES.

1,088,741.     Specification of Letters Patent.     Patented Mar. 3, 1914.

No Drawing.     Application filed April 21, 1913. Serial No. 762,560.

*To all whom it may concern:*

Be it known that I, EDWARD U. STEPHENS, a citizen of the United States, residing at Battle Creek, in the county of Calhoun and State of Michigan, have invented a new and useful Improvement in the Process for Preparing Leguminous Products for Edible Purposes.

This invention relates to a process, more especially for preparing beans for eating purposes, and has for its object to render ordinary naval or field beans convenient and easy for preparation, nutritious, appetizing, wholesome and attractive as an edible product in flake form.

The process contemplates the preparation of beans as a prepared food to be distributed in sealed cartons to the general grocery trade for individual consumption. It contemplates the elimination of all deleterious substance arising in their preparation without detracting from the wholesome and appetizing qualities usually destroyed where beans are hulled for marketing purposes.

The process consists in eliminating the distasteful and strong flavor by parboiling beans in a solution of water and sodium bicarbonate, rinsing the beans in pure water after having been parboiled, cooking them next in a solution of salt and pure water until done or nearly so, passing the beans through a drying process after having been cooked, passing them between rolls to reduce the same to flakes and then drying them until crisp and brittle. The process for drying the beans in the various stages before and after flaking and the means for removing the various liquors in which the beans have been treated, may be done in any expedient and convenient manner.

To prepare one hundred pounds of dry beans for flaking, a solution consisting of twelve ounces of sodium bi-carbonate, (common baking soda), and cold water sufficient to somewhat more than cover the beans, is prepared, and the beans brought to a boiling point, after which the parboiling solution is drained off, the beans rinsed in pure clear water, and thence cooked until done or nearly so in a solution of water containing salt enough, in the judgment of the operator or attendant in charge of the process, to flavor the same in an appetizing manner, the quantity of salt under ordinary circumstances, for one hundred pounds of dry beans being about (5½), five and one half pounds.

The beans having been cooked as aforesaid without breaking up their structure and drained of their saline water in which cooked, are next dried by subjecting the same to currents of air for eliminating all surplus moisture without drying the substance of the beans, after which the beans thus treated are passed between rolls and flaked, thence subjecting the flakes to a drying process which renders them, when brittle and crisp a finished product.

To prepare the flakes for eating, boiling milk, or boiling water and milk, to suit the taste of the user, is poured over the flakes and eaten in the manner of soups of other character.

Flakes not wholly done, may be further cooked by pouring milk, or milk and water over the same and bringing the same to the boiling point for a few minutes, as the occasion may require.

In lieu of parboiling the beans as hereinbefore set forth, they may be soaked in a bath of pure water, or a solution of pure water and soda for a period of from eight to twelve hours and thence cleared of the solution before cooking, at the option of the party in charge of the process.

Having therefore described my process for preparing and flaking beans, I claim:

1. The process for flaking beans, which consists in eliminating the strong and unpleasant flavor in their substance, by subjecting dry beans to a sodium bi-carbonate solution and bringing the solution to a boiling point, thence removing the solution from the beans, rinsing the beans in pure water, thence boiling the same in a solution of salted water adequate to the purpose until done or nearly so, without breaking their structure, thence eliminating the saline solution and all surplus moisture from the beans without drying their structure, thence passing the beans between rolls until flaked and then subjecting the flakes to a drying process that will render the same crisp and brittle.

2. The process for flaking beans, which consists first, in covering one hundred pounds of dry beans with tepid or cold water to which twelve ounces of sodium bi-carbonate (baking soda) has been added the solution thoroughly mixed and brought to a boiling point; second ridding the beans of the solution, and rinsing the same with pure water; third, charging the beans with pure water, tepid or boiling, in quantity to cover the same after which, or before the solution has been added five and one half pounds of salt has been supplied, and boiling the beans until done, or nearly so without breaking their structure; fourth drying the beans to the extent of removing all surplus moisture without injury to the bean substance; fifth, flaking the beans by passing the same between rolls; sixth, drying the flakes until crisp and brittle.

<p style="text-align:center">EDWARD U. STEPHENS.</p>

Witnesses:
 H. F. Wingate,
 F. H. Wingate.